United States Patent
Tadokoro et al.

(10) Patent No.: US 6,869,687 B2
(45) Date of Patent: Mar. 22, 2005

(54) RECYCLED PLASTIC PRODUCTS

(75) Inventors: Yoshio Tadokoro, Otsu (JP); Mikio Kodama, Hirakata (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/182,144

(22) PCT Filed: Jan. 25, 2001

(86) PCT No.: PCT/JP01/00501

§ 371 (c)(1),
(2), (4) Date: Jul. 26, 2002

(87) PCT Pub. No.: WO01/56785

PCT Pub. Date: Aug. 9, 2001

(65) Prior Publication Data

US 2003/0003297 A1 Jan. 2, 2003

(30) Foreign Application Priority Data

Feb. 1, 2000 (JP) ........................................ 2000-023760

(51) Int. Cl.$^7$ ........................... B32B 27/30; B32B 27/18
(52) U.S. Cl. ....................... 428/522; 428/332; 428/334; 428/517; 428/519; 428/520
(58) Field of Search ................................. 428/332, 334, 428/522, 517, 519, 520

(56) References Cited

U.S. PATENT DOCUMENTS

| 3,582,398 A | * | 6/1971 | Ringler ...................... 117/33.3 |
| 3,594,264 A | | 7/1971 | Urban |
| 3,793,402 A | | 2/1974 | Owens |
| 4,545,752 A | | 10/1985 | Hanamoto et al. |

FOREIGN PATENT DOCUMENTS

| GB | 2 028 228 A | 3/1980 |
| JP | 55-59929 A | 5/1980 |
| JP | 4-270652 A | 9/1992 |
| JP | 7-9484 A | 1/1995 |
| JP | 09-234836 A | 9/1997 |
| JP | 10-100329 A | 4/1998 |
| JP | 10-329169 A | 12/1998 |

* cited by examiner

*Primary Examiner*—Daniel Zirker
(74) *Attorney, Agent, or Firm*—Sughrue Mion, PLLC

(57) ABSTRACT

The present invention provides a recycled plastic article obtained by modifying the surface of a molded article formed from a collected plastic with a colored film which comprises an acrylic resin containing an ultraviolet absorber and has a thickness of from 50 $\mu$m to 600 $\mu$m. Plastics which are used widely in domestic electric products, automobile parts, industrial parts and the like and have various tones are modified with an acrylic resin film so colored to an extent as to provide color shielding of the ground collected resin, to collect the plastics and produce an article without being influenced by the color of the original materials.

9 Claims, No Drawings

RECYCLED PLASTIC PRODUCTS

FIELD OF THE INVENTION

The present invention relates to a recycled plastic article obtained by modifying a molded article formed from a collected plastic with an acrylic resin film.

BACKGROUND OF THE INVENTION

For recycling, collected plastic articles are often re-pelletized and are used as a pile outdoors and the like. The reason for this is that, regarding plastics collected from domestic electric products, automobile parts, industrial parts and the like, tone in the case of recycling may be limited to dark color, generally, black and the like, since the plastic articles are colored in various tones, and have stains or are discolored caused by use, although the kinds of resins used therein can be recognized.

On the other hand, because of excellent transparency, acrylic resin films are used widely, while maintaining transparency or being with printing, coloration and the like, for modifying the surface of a molded article. The molded article coated with an acrylic resin film may include a molded article made from, for example, a polycarbonate resin, an acrylonitrile-butadiene-styrene (ABS) resin, a polystyrene (PS) resin, a polypropylene (PP) resin and the like. Further, since acrylic resins are generally excellent in weather resistance, a method of coating a surface of polycarbonate resin sheet and the like is disclosed, for example, in Japanese Patent Application Publication (JP-B) No. 47-19119 (=U.S. Pat. No. 3,594,264), Japanese Patent Application Laid-Open (JP-A) No. 55-59929 (=GB 2,028, 228), JP-A No. 4-270652 and the like. The acrylic resin film is required to have adhesion with a resin molded article to be coated, and is also required to maintain transparency of the acrylic resin even when colored.

SUMMARY OF THE INVENTION

The present inventors have intensively studies on collection and recycle of plastics such as ABS resins, PS resins, olefin resins and acrylic resins which are widely used in domestic electric products, automobile parts or industrial parts and which show various tones, from the standpoint of global environment protection. As a result, the present inventors have found that, by modifying the surface of parts which are molded from collected plastics with a specific acrylic resin film, a surface-modified article may be obtained while maintaining transparency of acrylic resin film and having deep coloration, without being influenced by the colors of various collected parts. The present invention have accomplished based on the findings.

Namely, the present invention provides a recycled plastic article obtained by modifying the surface of a molded article formed from a collected plastic with a colored film which comprises an acrylic resin containing an ultraviolet absorber and has a thickness of from 50 µm to 600 µm.

DETAILED DESCRIPTION OF THE INVENTION

The collected plastic for a recycled plastic article of the present invention may be a thermoplastic resin which is collected from domestic electric products, automobile parts, industrial parts and the like and is not particularly restricted. Examples thereof include styrene resins such as polystyrene, high impact polystyrene (HIPS), styrene-acrylonitrile copolymer, styrene-methyl methacrylate copolymer, acrylonitrile-butadiene-styrene (ABS) resin, acrylonitrile-(ethylene-propylene rubber)-styrene (AES) resin, acrylonitrile-acrylic rubber-styrene (AAS) resin, and acrylonitrile-chlorinated polyethylehe-styrene (ACS) resin, ester resins such as polycarbonate, polybutylene terephthalate and polyethylene terephthalate, modified polyphenylene ether resins, acrylic resins such as methyl polymethacrylate, polyolefin resins and the like. Usually, ground materials of these collected plastics may be used for molding.

Preferable acrylic resin which is used as a film for coating a molded article formed from the collected plastics is, for example, an alkyl polymethacrylate, a copolymer of an alkyl methacrylate with an alkyl acrylate or the like. The copolymer, for example, preferably has 50% by weight to 99% by weight of alkyl methacrylates with 50% by weight to 1% by weight of alkyl acrylates are preferable. The copolymer may contain other monomers as copolymerization components as long as the objectives of the present invention are not deteriorated. Here, the alkyl methacrylate may be, for example, methyl methacrylate, ethyl methacrylate, propyl methacrylate or the like. Particularly, methyl methacrylate is preferred. The alkyl acrylate may be, for example, methyl acrylate, ethyl acrylate, propyl acrylate, isopropyl acrylate, butyl acrylate, isobutyl acrylate, hexyl acrylate, octyl acrylate or the like. The number of carbon atoms in the alkyl of the alkyl acrylate may be in the range of from about 1 to 10, and is preferably 2 or more. The acrylic resins may be a general-purpose commercially available products. The acrylic resins may include a resin called impact-resistance acrylic resin. From the standpoint of weather resistance and chemical resistance, the resins containing no impact resistant acrylic resin are preferred as the surface layer. On the other hand, from the standpoint of the flexibility of a film thereof, it is preferred to use an impact resistant acrylic resin in a colored single layer film or in a coloration layer of a multi-layer film.

It is suitable that the acrylic resin used in the present invention has a glass transition temperature of from 40 to 110° C. and has a weight-average molecular weight of from 70000 to 700000. The glass transition temperature can be measured by using a differential scanning calorimeter under a nitrogen atmosphere at a temperature-raising rate of 10° C./min. The weight-average molecular weight can be measured by gel permeation chromatography (GPC). When the glass transition temperature is too low, there is a tendency that a film having necessary surface hardness is not obtained. When the weight-average molecular weight is too small, since the melt viscosity of the polymer is too low and molding property in processing into film deteriorates, there is a tendency that it is difficult to control the thickness of the film precisely. On the other hand, when the weight-average molecular weight is too large, the melt viscosity of the polymer tends to be too high and molding property in processing into a film may deteriorate, and also there is a tendency of problems due to generation of extraneous materials in the form of gel in the resulting film. While generally the glass transition temperature of acrylic resins is roughly in the range of from 30° C. to 110° C., the acrylic resins having a relatively high glass transition temperature in the range of from 40° C. to 110° C. may be appropriately selected as the acrylic resin to be used in the present invention among general acrylic resins. Preferably, the acrylic resin has a glass transition temperature of 60° C. or more, and of 106° C. or less. Since the glass transition temperature of the acrylic resin is determined depending on the composition of monomers, the monomer composition may be appropriately selected so as to provide a glass transition temperature in the above-mentioned range.

The polymer or copolymer may be used, as the acrylic resin, singly without modification, or the two or more polymers or copolymers may be used in admixture thereof. Particularly for raising the surface hardness of a film, it is advantageous to use a mixture containing at least one polymer or copolymer which is an acrylic resin having a weight-average molecular weight in the range of from 70000 to 200000. Moreover, for simultaneously achieving improvement in surface hardness and improvement in molding property such as prevention of generation of unevenness in thermal molding after film formation, it is advantageous to use a mixture containing at least one component having a weight-average molecular weight in the range of from 70000 to 200000 and at least one component having a weight-average molecular weight in the range of from 150000 to 700000. In this case, the latter component may have a weight-average molecular weight in the range of from 150000 to 700000, provided that the molecular weight is larger than the weight-average molecular weight of the former component. When the molecular weight distribution by GPC of such a mixture is observed, a form having a spread skirt part or a form containing a shoulder part is found. The component having a weight-average molecular weight in the range of from 70000 to 200000 appropriately has a glass transition temperature in the range of from 90° C. to 110° C. The component having a weight-average molecular weight in the range of from 150000 to 700000 appropriately has a glass transition temperature in the range of from 40° C. to 80° C.

It is also advantageous to use a composition containing an impact-resistant acrylic resin which is an acrylic rubber particle having a single layer or multi-layer structure. Particularly, an acrylic polymer of multi-layer structure containing a rubber elastic layer is advantageous. The acrylic polymer may be an acrylic polymer having a multi-layer structure composed of at least two layers, and preferably of three layers. Such an acrylic polymer having a multi-layer structure may be, for example, an acrylic polymer of two-layer structure having an inner layer made of a rubber elastic body composed of a copolymer of an alkyl acrylate having 4 to 8 carbon atoms in the alkyl with a poly-functional monomer and with optional other mono-functional monomers and an outer layer made of a hard polymer composed of methyl methacrylate as the main component. Alternatively, the acrylic polymer having a multi-layer structure may be an acrylic polymer of three-layer structure having an innermost layer made of a hard polymer composed of methyl methacrylate as the main component, an intermediate layer made of a rubber elastic body composed of a copolymer of an alkyl acrylate having 4 to 8 carbon atoms in the alkyl with a poly-functional monomer and with optional other mono-functional monomers, and an outermost layer made of a hard polymer composed of methyl methacrylate as the main component. Among them, the latter one having a three-layer structure is preferred. The acrylic polymer having a multi-layer structure can be produced, for example, by methods described in JP-B No. 55-27576 (=U.S. Pat. No. 3,793,402) and the like. The poly-functional monomer used herein is a compound having in the molecule thereof at least two polymerizable carbon-carbon double bonds, and may be, for example, alkenyl esters of unsaturated carboxylic acids such as allyl (meth)acrylate and methallyl (meth)acrylate, dialkenyl esters of di-basic acids such as diallyl maleate, unsaturated carboxylic acid diesters of glycols such as alkylene glycol di(meth)acrylates, and the like.

The mean particle size of the impact-resistant acrylic resin may be usually from 50 nm to 500 nm. The mean particle size is preferably 100 nm or more (and more preferably 250 nm or more) and is preferably 400 nm or less (and more preferably 350 nm or less). When the particle size is too small, the resulting film tends to have lowered impact resistant. When the particle size is too large, the resulting film tends to have lowered transparency. The impact-resistant acrylic resin composition can be easily produced, for example, by kneading an acrylic resin with an impact-resistant acrylic resin containing a rubber elastic layer. The composition may also contain other components for polymer as long as the objectives of the present invention are not deteriorated.

The acrylic resin composition is excellent in a property of molding into a film, and can be easily molded into a film by, for example, extrusion casting with a chilled roll, extrusion molding method in which a film is molded while keeping the both surfaces of the film in contact with the surfaces of rolls, belt cooling extrusion method in which a film is molded while keeping the both surfaces of the film in contact with the surfaces of metal belts, inflation extrusion molding method, solvent casting method or the like. Further, in molding of a general film, a screen mesh made of metals, sintered ceramics or the like may be placed on the passage of a melted resin for the purpose of preventing extraneous materials from being contaminated. In this method, however, when a fine mesh is used, the mesh may be clogged immediately and, therefore, a production line should be stopped frequently and clogged materials should be removed, in some cases. In such a case, by using a rotary-type screen changer (for example, a screen changer manufactured by Gnois, GE or the like), a film with no extraneous materials having a size of 100 $\mu$m or less can be produced without stopping the production line, which such materials having bad influences on optical ability or printing property of the film.

Thus-obtained film is, due to its sufficient thickness precision, surface smoothness, surface hardness and excellent molding processability, desirable from the standpoints of decrease in outer haze and prevention of print omission, that is a printing property of design. Therefore, the film is optimally utilized in a simultaneous injection method and a surface coating method. Particularly, it is preferred, from the standpoints of the thickness precision and surface smoothness of a film, that molding is conducted in a method of keeping the both surfaces of a film product obtained by melt extrusion molding in contact simultaneously with the surfaces of metal rolls or the surfaces of metal belts.

The thus-obtained film may have design printed on one surface thereof, or may have coating for adhesion or for being antistatic on the outermost layer thereof. Further, the film may be a film which is previously shaped by performing thermal molding (such as vacuum molding) and which is utilized in a simultaneous injection method. Furthermore, it is possible for the film to have a structure containing backing with a film or sheet that is made of other resins, for example, other acrylic resins, vinyl chloride resins, transparent ABS resins, polycarbonate resins, polyolefin resins and the like. Particularly, a multi-layer film combining a colored acrylic resin with a transparent acrylic resin is effective as automobile exterior plates such as bumpers, garnishes and side moles or painting substitution in domestic electric products, due to the color depth of a coloration layer that is viewed through a transparent layer, and due to features such as the weather resistance and surface hardness of acrylic resin. For film molding processing of such a film, it is preferably to conduct a multi-layer film molding method by a multi-layer extrusion method.

In the multi-layer film, a combination of films by changing an acrylic resin composition is possible, and alternatively, a surface layer made of a general-purpose acrylic resin containing no rubber elastic body may be provided as a surface layer of a film made of acrylic resin composition containing a rubber elastic body. When the multi-layer film having a transparent layer made of a general-purpose acrylic resin is used, the resulting film can have a surface pencil hardness of 2H. When a transparent acrylic resin is used as a surface layer, the transparent acrylic resin preferably has a weight-average molecular weight in the range of from 70000 to 600000. More preferably, the weight-average molecular weight is 120000 or more, and is 300000 or less. Further, the transparent acrylic resin preferably has a glass transition temperature of 60° C. to 110° C. More preferably, the glass transition temperature is 75° C. or more, and is 106° C. or less.

The thickness of a film used in the present invention is in the range of from 50 μm to 600 μm, and is preferably in the range of from about 100 μm to 600 μm. When a recycled plastic article of the present invention is produced industrially, a method of feeding a film continuously is desirable. Therefore, when the thickness of a film is over 600 μm, the film cannot be wound in the form of continuous roll, undesirably. Further, when a film is fed continuously, a film thickness of from 100 μm to 300 μm is preferred from the standpoints of decrease in winding weight and of shaping property in vacuum molding. When the film thickness is over 300 μm, it is advantageous to feed the film into a mold, in each piece.

When the article of the present invention is produced by a simultaneous injection method, the resin which is melt-injected in a mold can be selected from various thermoplastic resins which are collected from domestic electric products, automobile parts, industrial parts and the like, as described above. Use of a resin composition containing acrylic resins in an amount of 10% by weigh or less in the resins to be melt-injected is advantageous since close adherence with a film increases. The simultaneous injection method can be conducted, for example, in accordance with a method which is described in JP-B Nos. 63-6339 (=U.S. Pat. No. 4,545,752), 4-9647, and JP-A No. 7-9484 or the like. Namely, a negative mold and a positive mold forming a cavity space are opened, a film is inserted between the both molds, the both molds are closed sandwiching the film and are clamped, a melted thermoplastic resin is injected from a gate, is filled in the cavity and is solidified by cooling, to adhere the film integratedly with the surface of the injected molded body, and then, the both molds are opened. A laminated molded article can be thus obtained. The conditions of injection molding such as resin temperature and injection pressure are set at appropriate values in view of the kind of injected resin and the like.

In the present invention, the surface of a molded article formed from collected plastics is modified with a colored film which comprises an acrylic resin containing an ultraviolet absorber. The ultraviolet absorber may be the same kind of absorber as usually added to acrylic resin. Specifically, the ultraviolet absorber may be benzotriazole ultraviolet absorbers, benzophenone ultraviolet absorbers or the like, which may be used each alone or in combination of two or more. From the standpoints of reduction in volatile amounts of absorber from a film and prevention of deterioration of a ground layer, a benzotriazole ultraviolet absorber having a large molecular weight is preferred. The suitable benzotriazole ultraviolet absorber may include, for example, 2,2'-methylenebis[6-(2H-benzotriazol-2-yl)-4-(1,1,3,3-tetramethylbutyl)phenol], 2-[2-hydroxy-3-(3,4,5,6-tetrahydrophthalimidemethyl)-5-methylphenyl] benzotriazole or the like.

When a colored film having a single-layer structure is used, an ultraviolet absorber may be present in it. When a multi-layer film is used, it is preferred to allow an ultraviolet absorber to be contained in an acrylic resin of the first layer (surface layer). By thus allowing an ultraviolet absorber to be contained in the surface layer, discoloration of a second or a subsequent layer, which of which may contain a coloration layer, can be suppressed. The amount of an ultraviolet absorber to be used may be usually from about 0.1% by weight to 2% by weight, per the amount of acrylic resin which constitutes a single-layer film or a surface layer of a multi-layer film.

The acrylic resin composition constituting a film may additionally contain usual additives. The additives may be, for example, hindered phenol antioxidants, phosphorus antioxidants, sulfur antioxidants, weather-proofing agents such as hindered amine-based light stabilizers, flame retardants, coloring agents, pigments, inorganic fillers and the like.

In the case of using a single layer film, the film itself may have the above-mentioned thickness. In the case of using a multi-layer film, the surface layer preferably has a thickness of about 50 μm to about 200 μm. When the thickness is less than 50 μm, the transparent depth of an acrylic resin film tends to deteriorate, possibilities may increase such that an ultraviolet ray easily permeate, which results in insufficient suppression in discoloration of a second layer containing a coloration layer increases. More preferably, the thickness is 80 μm or more. When the thickness of the surface layer is over 200 μm, the impact resistance of the resulting film is decreased. The thickness of the surface layer is preferably 150 μm or less.

Resins containing acrylic resins and acrylic rubbers in admixture thereof are commercially available and can be used. Such commercially available resins may include, for example, "(trade name) Oroglass DR" manufactured by Atohaas, "(trade name) Sumipex HT" manufactured by Sumitomo Chemical Co., Ltd and the like. The amount of acrylic rubber particles in the impact resistant acrylic resin may be usually from 5% by weight to 50% by weight per the amount of the acrylic resin.

In the case of using a multi-layer film, the coloration layer preferably has a thickness in the range of from about 150 μm to about 400 μm. When the thickness is less than 150 μm, color see-through tends to be remarkable due to decrease in thickness after vacuum molding, and therefore, the thickness is more preferably 200 μm or more. When the thickness is over 400 μm, cost tends to increase more than necessity. For coloration of a film, for example, the acrylic resin constituting the film may contain a coloring agent such as dye and pigment. The dye and pigment are selected and used appropriately depending on the intended color. The content of the coloring agent, which is contained in a resin composition constituting a coloration layer, may be usually about 1% by weight to about 20% by weight.

The coloration may be conducted using a metal powder to obtain a metallic color. A flat metal powder such as a flat aluminum fragment is preferably used as the metal powder. By containing a mica which is subjected to a surface treatment and the like, a pearl-like color can also be provided. In the case of using a metal powder, a mica and the like, the amount thereof may be about 1% by weight to about 10% by weight in a resin composition constituting a colored film. The metal powder, mica and the like may be used together with the above-mentioned coloring agent, or may be used each singly. When a metal powder, mica or the like is used together with a coloring agent, an acrylic resin film which shows a metallic or pearl-like tone and is colored can be obtained. When a metal powder is used singly, a metallic color having a tone corresponding to the kind of the used metal is obtained. Specifically, when an aluminum fragment is used singly, a silver metallic color is obtained.

Onto an acrylic resin film used in the present invention, an adhesive backing layer may be laminated at the side of contact with a molded article formed from a collected plastic. In this case, the thickness of the adhesive backing layer may be appropriately 150 μm or more. By lamination of such a backing layer, adhesion may be raised between a collected polyolefin resin and the like with an acrylic resin, while the collected polyolefin resin and the like originally has poor adhesion with the acrylic resin. Also, the lamination of the backing layer may avoid see-through looking of the color of the collected molded resin through the acrylic resin film, or may make contrast of color excellent. When a backing layer is provided onto a multi-layer film, it is advantageous to place a transparent acrylic resin containing an ultraviolet absorber as a surface layer, an acrylic resin which is non-transparently colored as a second layer below the surface layer, and a backing layer as a third layer below the second layer.

In the present invention, when physical properties which are typically represented by impact resistance are satisfied, a collected plastic can be used as it is. However, since physical properties generally decrease, it is preferred to add and mix a physical-property improving and reinforcing agent in/with the collected plastic in an amount of 0.01% by weight to 30% by weight. More preferably, the physical-property improving and reinforcing agent is mixed in an amount of 1% by weight to 30% by weight. By mixing the physical-property improving and reinforcing agent as described above, the recycling frequency of a collected plastic increases steeply, and repeated collection recycle becomes possible.

The physical-property improving and reinforcing agent referred to herein is a chemical agent which is added to a plastic for improving physical properties, particularly strength, of a plastic product. The physical-property improving and reinforcing agent may include various kinds of elastomer, rubber, graft copolymer and the like. The elastomer includes thermoplastic elastomer such as polyester elastomer, polyurethane elastomer and polyamide elastomer. The rubber includes diene rubber such as polybutadiene rubber, butadiene-styrene copolymer rubber, butadiene-acrylonitrile copolymer rubber, isoprene rubber and chloroprene rubber, ethylene-butene copolymer rubber, ethylene-propylene rubber such as ethylene-propylene copolymer rubber and ethylene-propylene-nonconjugated diene copolymer rubber, acrylic rubber, silicone rubbers and the like. The graft polymer includes those obtained by polymerizing the above rubbers with vinyl monomers. Among them, a graft polymer obtained by polymerizing rubber with at least an aromatic vinyl monomer is preferred. In this case, a graft polymer obtained by polymerizing vinyl cyanide monomer together with an aromatic vinyl monomer is also advantageous. The physical-property improving and reinforcing agent is used particularly advantageously when a collected plastic is the above-mentioned styrene resin.

The rubber constituting a graft polymer, which is a physical-property improving and reinforcing agent, may include those described above, and is preferably diene rubber such as polybutadiene and butadiene-styrene copolymer rubber, ethylene-propylene rubber and ethylene-propylene-non-conjugated diene copolymer rubber which is obtained by introducing a non-conjugated diene component (such as ethylidene norbornene, dicyclopentadiene and 1,4-hexadiene) as a third component into ethylene-propylene rubber. More preferable examples may include ethylene-propylene-non-conjugated diene copolymer rubber having an ethylene content of 30% by weight to 80% by weight and a Mooney viscosity (which is represented by [ML(1+4)121° C.]) in the range of 40 to 80. The aromatic vinyl monomer may include styrene, α-methylstyrene, p-methylstyrene, bromostyrene and the like, which may be used each alone or in combination of two or more. Among them, styrene and α-methylstyrene are preferred. The vinyl cyanide monomer may include acrylonitrile, methacrylonitrile and the like which may be used each alone or in combination if necessary.

A part of aromatic vinyl monomers constituting the above-mentioned graft polymer can also be substituted by other monomers which are copolymerizable therewith. Such monomers may include (meth)acrylic monomers such as methyl methacrylate and methyl acrylate, maleimide monomers such as N-phenylmaleimide and N-cyclohexylmaleimide, unsaturated carboxylic acids such as acrylic acid, methacrylic acid, itaconic acid and fumaric acid, which may be used each alone or in combination of two or more.

The above-mentioned aromatic vinyl monomer and the vinyl cyanide monomer are preferably used, respectively, in amount of 50% by weight to 100% by weight and in amount of 0% by weight to 50% by weight. The composition ratio of rubber to monomers (in total) is also not particularly restricted, and is preferably a ratio such that the rubber is used in an amount of 10% by weight to 80% by weight and the monomers (in total) are used in an amount of 90% by weight to 20% by weight. The graft ratio of the graft polymer is also not particularly restricted, and is preferably a ratio in the range of from 10% to 150%, and is more preferably in the range of from 30% to 100%.

The method of molding an article of the present invention may include an in-mold simultaneous injection method, a method in which a film shaped once by thermal molding and the like is inserted into a mold, and then, is injection-molded, a method in which a film is laminated in extrusion molding and the like. Of course, an article which is obtained by secondary processing of the resulting article is also included in the present invention. For example, when a surface-matted article is needed, there is a method to be conducted such that the surface of a metal roll and the like, which is called mat or grain, is transferred onto a film in the production of the film. In this case, if the processing is conducted at a temperature such that the temperature of a metal roll or the like to be transferred is not lower than the temperature of the secondary processing of the film, mat or grain flow after the secondary processing can be prevented. In addition, the methods of obtaining other surface-matter articles may include a method in which mat or grain can be performed on the surface (to which a film comes into contact) of a metal roll for extrusion molding or of a mold for thermal molding or injection molding, when the film of the present invention is subjected to surface modification and pasting.

The significance of the present invention may reside in that domestic electric products, automobile parts, industrial parts and the like which are used one or more times can be collected and plastics used therein can be recycled for protecting global environments as described above.

Namely, in accordance with the present invention, plastics obtained by grinding articles which are colored in various tones are used and are molded, and then, the surface of the resulting molded article is modified with a colored acrylic resin film, to reproduce the plastic as an article excellent in transparency, see-through looking, color depth or the like. Further, when a physical-property improving and reinforcing agent is added to the collected plastic which is then molded, an article also excellent in physical properties can be reproduced.

EXAMPLE

The present invention will be illustrated further in detail below referring to Examples, which should not be construed as a limitation upon the scope of the present invention.

In Examples, "%" and "part(s)" representing content or amount to be used are based on weight (by weight) unless otherwise stated.

Raw materials shown below were prepared and these were appropriately used in Examples.

Acrylic Resin I

Acrylic resin I is a resin comprising 99% of a methyl methacrylate unit and 1% of a methyl acrylate unit and having a glass transition temperature of 106° C. and a weight-average molecular weight of 140000, which was produced by a bulk polymerization method.

Acrylic Resin II

Acrylic resin II is a resin comprising 90% of a methyl methacrylate unit and 10% of a methyl acrylate unit and having a glass transition temperature of 95° C. and a weight-average molecular weight of 120000, which was produced by a bulk polymerization method.

Acrylic Resin III

Acrylic resin III is a resin comprising 80% of a methyl methacrylate unit and 20% of a butyl acrylate unit and having a glass transition temperature of 62° C. and a weight-average molecular weight of 300000, which was produced by a suspension polymerization method.

Acrylic Polymer A

Acrylic polymer A was produced in accordance with Example 3 of JP-B No. 55-27576 (=U.S. Pat. No. 3,793,402) and has a three-layer structure in the form of sphere having a mean particle size of about 300 nm. Acrylic polymer A has an innermost layer made of a cross-linked polymer which was obtained by polymerization of a methyl methacrylate with a small amount of allyl methacrylate, an intermediate layer made of a soft rubber elastic body which was obtained by polymerization of a butyl acrylate as the main component with a styrene and a small amount of allyl methacrylate and an outermost layer made of a hard polymer which was obtained by polymerization of a methyl methacrylate with a small amount of ethyl acrylate.

Acrylic Polymer B

Acrylic polymer B was produced in accordance with the same manner as in Example 3 of JP-B No. 55-27576 (=U.S. Pat. No. 3,793,402) except that an innermost layer made of a cross-linked polymer layer was not formed, and has a two-layer structure in the form of sphere having a mean particle size of about 300 nm. Acrylic polymer B has an inner layer made of a soft rubber elastic body which was obtained by polymerization of a butyl acrylate as the main component with a styrene and a small amount of allyl methacrylate and an outer layer made of a hard polymer which was obtained by polymerization of a methyl methacrylate with a small amount of ethyl acrylate.

Ultraviolet Absorber

"Adekastab LA-31" (chemical name: 2,2'-methylenebis [6-(2H-benzotriazol-2-yl)-4-(1,1,3,3-tetramethylbutyl) phenol], manufactured by Asahi Denka Kogyo K. K.), that is a benzotriazole-based absorber having large molecular weight, was used as an ultraviolet absorber.

Physical-Property Improving and Reinforcing Agent A

Physical-property improving and reinforcing agent A is a polymer which was obtained by graft polymerization of 50 parts of an ethylene-propylene-dicyclopentadiene rubber having an ethylene content of 41%, an iodine value of 15 and Mooney viscosity of 60, 35 parts of a styrene and 15 parts of an acrylonitrile in a suspension polymerization method so as to have a graft ratio of 40%.

Physical-Property Improving and Reinforcing Agent B

Physical-property improving and reinforcing agent B is a polymer which was obtained by graft polymerization of 50 parts of an ethylene-propylene-dicyclopentadiene rubber having an ethylene content of 41%, an iodine value of 15 and Mooney viscosity of 60, and 50 parts of a styrene is a suspension polymerization method so as to have a graft ratio of 40%.

Physical-Property Improving and Reinforcing Agent C

Physical-property improving and reinforcing agent C is a polymer which was obtained by graft polymerization of 50 parts of a polybutadiene rubber having a gel content of 95% and a mean particle size of 0.3 µm, 35 parts of a styrene and 15 parts of an acrylonitrile in an emulsion polymerization method so as to have a graft ratio of 45%.

Production of resin compositions was conducted by a method in which raw materials was kneaded in a tumbler-type mixer and was palletized by melt-kneading while maintaining the resin temperature at 255° C. using a twin-screw extruder having the same rotation direction.

Example 1

Resin composition pellets which had been obtained by kneading 78% of Acrylic resin I, 18% of Acrylic polymer A and 4% of an inorganic red pigment were fed into a single-screw extruder (manufactured by Toshiba Machine Co., Ltd.) having a barrel diameter of 65 mmø. Separately, resin composition pellets which had been obtained by kneading 99% of Acrylic resin II and 1% of an ultraviolet absorber (Adekastab LA-31) were fed into a single-screw extruder (manufactured by Hitachi Zosen Corp.) having a barrel diameter of 45 mmø. The pellets were extruded through a two-layer multi-manifold-type film dice (lip clearance: 0.5 mm, width: 600 mm) having a set temperature of 250° C., which had been connected to the both extruders and were molded while allowing the both surfaces of the resulting film to contact completely to cooling polishing rolls, to obtain a multi-layer film having a total thickness of 0.3 mm (red layer: 0.2 mm, transparent layer: 0.1 mm).

The obtained film was warmed with a far infrared heater in an injection molding mold having a temperature of 50° C., and was molded in vacuum. Onto the rear surface (which is red layer side) of the resulting film, a resin composition which had been obtained by kneading ground materials prepared by grinding for recycle of plastics which had been collected from a cleaner made of an ABS resin and having an armouring of cream color was injection-molded under an injection pressure of 1150 kg/cm$^2$ at a resin temperature of 230° C., so as to have a size of 90 mm×150 mm×3 mm(thickness). As a result, a red injection molded article was obtained with no influence by the tone of the collected plastic.

The obtained molded article was placed as a specimen so that the multi-layer-film side faced upper direction, over which an impact core having a diameter of 12.7 mmø was placed. The impact core was allowed to fall naturally, to measure a minimum energy (unit: J) which was required for decomposing the specimen, as a surface impact strength. The obtained surface impact strength of the molded article was 50 J.

Examples 2 to 4

The same operation as in Example 1 was conducted except that the materials composed of 100% of the ABS-based collected plastic was substituted by resin compositions which had been obtained by kneading 98% of ground materials prepared by grinding for recycle of the same kind of ABS-based collected plastic as in Example 1 together with 2% of Physical-property improving and reinforcing agent A, Physical-property improving and reinforcing agent B or Physical-property improving and reinforcing agent C, respectively, to obtain red injection molded articles, each having no influence by the tone of the collected plastic. Regarding respective molded articles, surface impact strength was measured in the same manner as in Example 1. The results are shown in Table 1 together with the result in Example 1. From these results, the effects by Physical-property improving and reinforcing agent A, Physical-property improving and reinforcing agent B and Physical-property improving and reinforcing agent C were confirmed.

TABLE 1

| Example No. | Physical-property improving and reinforcing agent | Surface impact strength |
| --- | --- | --- |
| 1 | None | 50 J |
| 2 | A | 70 J |
| 3 | B | 65 J |
| 4 | C | 70 J |

Example 5

Resin composition pellets which had been obtained by kneading 30% of Acrylic resin II, 48% of Acrylic resin III, 18% of Acrylic polymer B and 4% of a flat aluminum powder having a mean particle size of 30 μm and an average thickness of 5 μm (manufactured by Toyo Aluminum K. K.) were fed into a single-screw extruder (manufactured by Toshiba Machine Co., Ltd.) having a barrel diameter of 65 mmø. The pellets were extruded through a film dice (lip clearance: 0.5 mm, width: 600 mm) having a set temperature of 250° C., which had been connected to the extruder, and were molded while allowing the both surfaces of the resulting film to contact completely to cooling polishing rolls, to obtain a film having a silver metallic color and a total thickness of 0.3 mm.

The obtained film was warmed with a far infrared heater in an injection molding mold having a temperature of 50° C., and was molded in vacuum. Onto the rear surface of the film, a resin composition which had been obtained by kneading ground materials prepared by grinding for recycle of plastics which had been collected from a television made of HIPS resin and having an armouring of black color was injection-molded under an injection pressure of 1150 kg/cm$^2$ at a resin temperature of 230° C., to so as to have a size of 90 mm×150 mm×3 mm(thickness). As a result, a silver metallic injection molded article was obtained with no influence by the tone of the collected plastic. Regarding the molded article, the surface impact strength was measured in the same manner as in Example 1 to obtain a value of 30 J.

Example 6

The same operation as in Example 5 was conducted except that the materials composed of 100% of the HIPS-based collected plastic was substituted by a resin composition which had been obtained by kneading 98% of ground materials prepared by grinding for recycle of the same kind of HIPS-based collected plastic with 2% of Physical-property improving and reinforcing agent A, to obtain a silver metallic injection molded article having no influence by the tone of the collected plastic. Regarding the molded article, the surface impact strength was measured in the same manner as in Example 1, to obtain a value of 40 J. From this result, the effect by Physical-property improving and reinforcing agent A was confirmed.

What is claimed is:

1. A recycled plastic article comprising a molded article and a colored film coated on the molded article, wherein the molded article is formed from a recycled styrene plastic and a reinforcing agent containing a graft polymer obtainable by polymerizing a rubber with at least an aromatic vinyl monomer and the colored film has a thickness of from 50 μm to 600 μm and comprises (i) a transparent acrylic resin layer containing an ultraviolet absorber as a surface layer and (ii) a non-transparently colored acrylic resin layer.

2. The article according to claim 1, wherein the recycled plastic contains at least one of ground domestic electric products, automobile parts or ground industrial parts.

3. The article according to claim 1, wherein the colored film is a multi-layer film having a transparent acrylic resin containing an ultraviolet absorber as a surface layer, an acrylic resin which is non-transparently colored as a second layer adjacent the surface layer, and an adhesive backing layer as a third layer being in contact with the molded article formed from the collected plastic.

4. The article according to any one of claims 1, 2 and 3, wherein the colored film is a film which is obtainable by allowing both surfaces of a film which has been obtained by melt extrusion molding to contact simultaneously with the surfaces of metal rolls or the surfaces of metal belts, to mold the film.

5. The article according to claim 1, wherein the molded article is a molded article which is obtainable by adding and mixing a reinforcing agent in an amount of 0.01% by weight to 30% by weight to/with the collected plastic and molding the resulting mixture.

6. The article according to claim 5, wherein the reinforcing agent is a graft polymer which is obtainable by polymerizing a rubber with an aromatic vinyl monomer and a vinyl cyanide monomer.

7. The article according to claim 1, wherein the styrene plastic is at least one styrene plastic selected from a group consisting of polystyrene, high impact polystyrene, styrene-acrylonitrile copolymer, styrene-methyl methacrylate copolymer, acrylonitrile-butadiene-styrene resin, acrylonitrile-(ethylene-propylene rubber)-styrene resin, acrylonitrile-acrylic rubber-styrene resin, and acrylonitrile-chlorinated polyethylene-styrene resin.

8. The article according to claim 1, wherein the styrene plastic is at least one styrene plastic selected from a group consisting of high impact polystyrene, acrylonitrile-butadiene-styrene resin, and acrylonitrile(ethylene-propylene rubber)-styrene resin.

9. A method for producing a recycled plastic article comprising a molded article and a colored film, the method comprising the steps of:

forming a molded article from a recycled styrene plastic and a reinforcing agent containing a graft polymer obtainable by polymerizing a rubber with at least an aromatic vinyl monomer and coating the molded article with a colored film having a thickness of from 50 $\mu$m to 600 $\mu$m and comprising (i) a transparent acrylic resin layer containing an ultraviolet absorber as a surface layer and (ii) a non-transparently colored acrylic resin layer.

* * * * *